US012698981B2

(12) United States Patent
Matsumoto

(10) Patent No.: US 12,698,981 B2
(45) Date of Patent: Aug. 4, 2026

(54) STEP MEASUREMENT DEVICE, MEASUREMENT METHOD, AND STORAGE MEDIUM

(71) Applicant: CASIO COMPUTER CO., LTD., Tokyo (JP)

(72) Inventor: Naoya Matsumoto, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 388 days.

(21) Appl. No.: 18/415,759

(22) Filed: Jan. 18, 2024

(65) Prior Publication Data

US 2024/0247949 A1 Jul. 25, 2024

(30) Foreign Application Priority Data

Jan. 19, 2023 (JP) ................................. 2023-006795

(51) Int. Cl.
*G01C 22/00* (2006.01)
(52) U.S. Cl.
CPC .................................. *G01C 22/006* (2013.01)
(58) Field of Classification Search
CPC .............................. G01C 22/006; G01C 21/20
See application file for complete search history.

(56) References Cited

U.S. PATENT DOCUMENTS 10,018,481 B1 * 7/2018 Shekhar ............... G01C 22/006

FOREIGN PATENT DOCUMENTS

JP 2009116389 A 5/2009

* cited by examiner

*Primary Examiner* — Timothy P Graves
(74) *Attorney, Agent, or Firm* — Scully, Scott, Murphy & Presser, P.C.

(57) ABSTRACT

A measurement device includes: an accelerometer; a storage; and at least one processor. In accordance with instructions stored in the storage, the processor acquires data of an acceleration waveform during walking or running of a user from the accelerometer, identifies a time width between a first timing and a second timing based on the acceleration waveform, and counts steps based on the acceleration waveform. The acceleration waveform changes from a negative value to a positive value at the first timing. The acceleration waveform changes from a positive value to a negative value at the second timing. When a predetermined condition is satisfied in counting the steps, the processor counts the acceleration waveform whose time width is greater than a predetermined threshold as two steps and count the acceleration waveform whose time width is smaller than the predetermined threshold as one step.

20 Claims, 11 Drawing Sheets

FIG.4

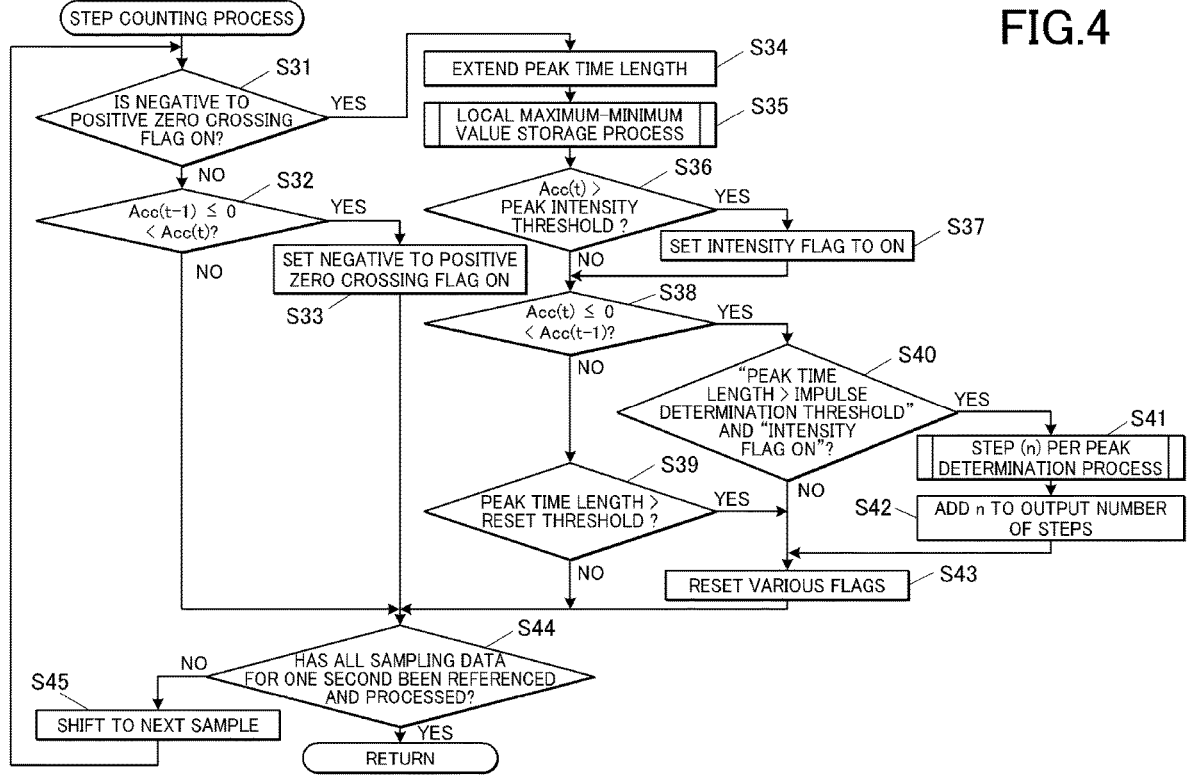

STEP COUNTING PROCESS

S31 IS NEGATIVE TO POSITIVE ZERO CROSSING FLAG ON?

S32 Acc(t−1) ≤ 0 < Acc(t)?

S33 SET NEGATIVE TO POSITIVE ZERO CROSSING FLAG ON

S34 EXTEND PEAK TIME LENGTH

S35 LOCAL MAXIMUM-MINIMUM VALUE STORAGE PROCESS

S36 Acc(t) > PEAK INTENSITY THRESHOLD ?

S37 SET INTENSITY FLAG TO ON

S38 Acc(t) ≤ 0 < Acc(t−1)?

S39 PEAK TIME LENGTH > RESET THRESHOLD ?

S40 "PEAK TIME LENGTH > IMPULSE DETERMINATION THRESHOLD" AND "INTENSITY FLAG ON"?

S41 STEP (n) PER PEAK DETERMINATION PROCESS

S42 ADD n TO OUTPUT NUMBER OF STEPS

S43 RESET VARIOUS FLAGS

S44 HAS ALL SAMPLING DATA FOR ONE SECOND BEEN REFERENCED AND PROCESSED?

S45 SHIFT TO NEXT SAMPLE

RETURN

AMPLITUDE

SAMPLE NUMBER t

SAMPLE NUMBER t−1

0

NEGATIVE TO POSITIVE ZERO CROSSING $Acc(t-1) \leq 0 < Acc(t)$

AMPLITUDE

SAMPLE NUMBER t−1

0 t

SAMPLE NUMBER t

POSITIVE TO NEGATIVE ZERO CROSSING $Acc(t) \leq 0 < Acc(t-1)$

FIG.6A
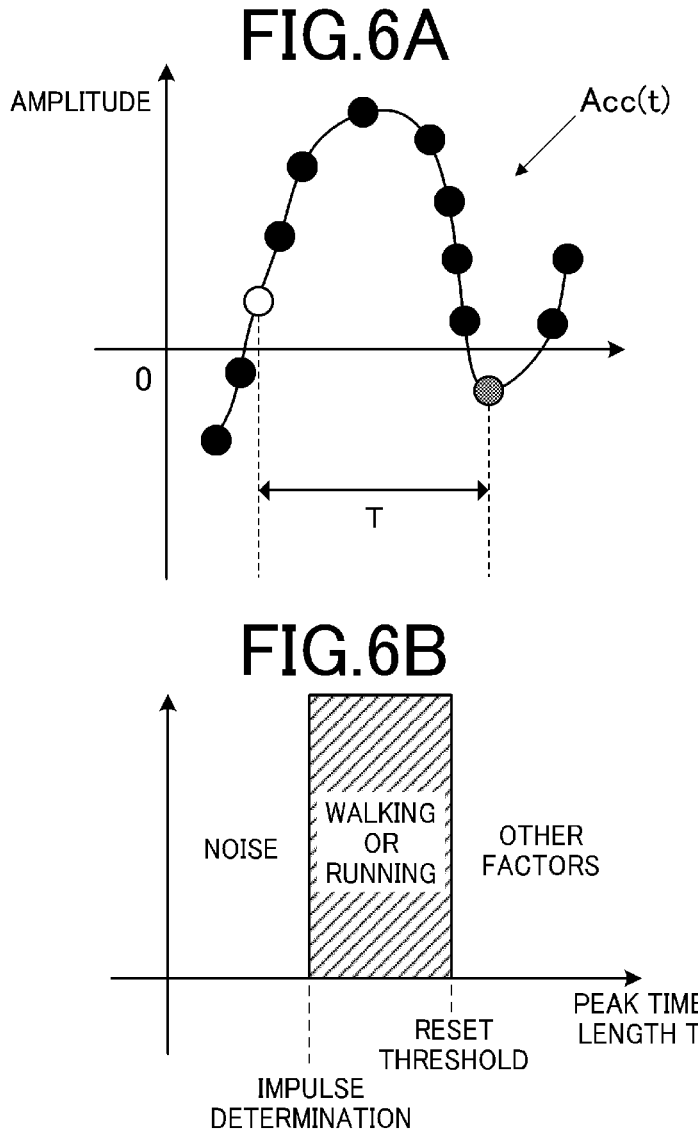
FIG.6B
FIG.6C
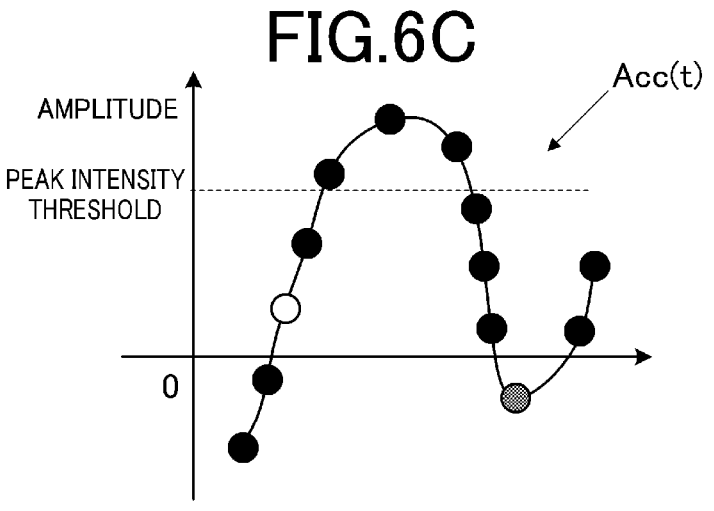

STEP MEASUREMENT DEVICE, MEASUREMENT METHOD, AND STORAGE MEDIUM

TECHNICAL FIELD

The present disclosure relates to a measurement device, measurement method, and a storage medium.

DESCRIPTION OF RELATED ART

Conventionally, there is known a pedometer that is worn and used on a user's arm or waist. For example, JP 2009-116389 A discloses, for the purpose of accurately measuring the steps with a pedometer, a technique of detecting a local minimum value and a local maximum value (peak) of acceleration acquired from an acceleration sensor, and adding one to the number of steps when the difference between the continuous local minimum value and local maximum value is greater than a threshold.

SUMMARY OF THE INVENTION

A measurement device according to an embodiment of the present disclosure includes:

an accelerometer;

a storage; and at least one processor that, in accordance with instructions stored in the storage, acquires data of an acceleration waveform during walking or running of a user from the accelerometer, identifies a time width between a first timing and a second timing based on the data of the acceleration waveform, the acceleration waveform changing from a negative value to a positive value at the first timing, the acceleration waveform changing from a positive value to a negative value at the second timing, and counts steps based on the acceleration waveform, wherein, upon a predetermined condition being satisfied in counting the steps, the at least one processor counts the acceleration waveform whose time width is greater than a predetermined threshold as two steps during the walking or the running and count the acceleration waveform whose time width is smaller than the predetermined threshold as one step during the walking or the running.

Further features of the present invention will become apparent from the following description of exemplary embodiments (with reference to the attached drawings).

BRIEF DESCRIPTION OF DRAWINGS

The accompanying drawings are not intended as a definition of the limits of the invention but illustrate embodiments of the invention, and together with the general description given above and the detailed description of the embodiments given below, serve to explain the principles of the invention, wherein:

FIG. 4 is a flowchart illustrating a step counting process;

FIG. 6A is a graph illustrating a peak time length;

FIG. 6B is a graph illustrating an impulse determination threshold and a reset threshold;

FIG. 6C is a graph illustrating a peak intensity threshold;

DETAILED DESCRIPTION

Hereinafter, one or more embodiments of the present disclosure will be described in detail with reference to the attached drawings. However, the scope of the present disclosure is not limited to the illustrated examples.

Measurement Device

Figure 1:
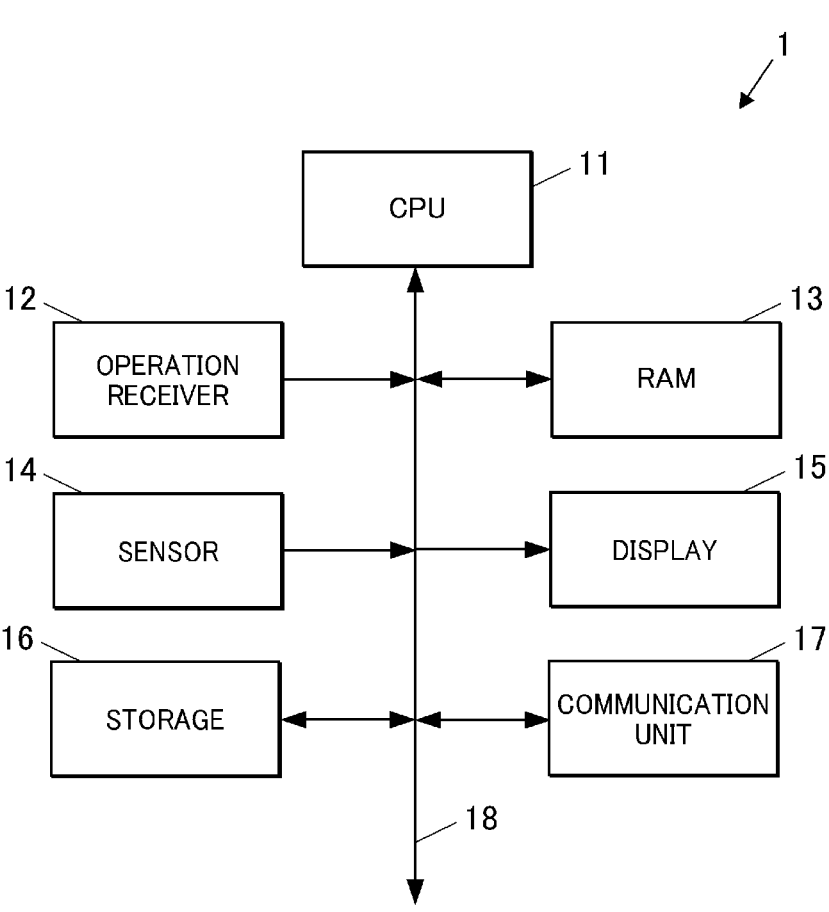
FIG. 1 is a block diagram illustrating a functional configuration of a measurement device of an embodiment according to the present disclosure.

First, with reference to FIG. 1, a functional configuration of a measurement device 1 will be described. FIG. 1 is a block diagram illustrating the functional configuration of the measurement device 1. Here, the measurement device 1 is an electronic device that is worn by a user who walks or runs (for example, on the user's arm) and moves with the user. In the following, the measurement device 1 is described as an electronic device dedicated for acquiring (counting) the number of steps while the user is walking or running, but it is not limited to this. The measurement device 1 may be a smartphone, a cellular phone, a smartwatch, or the like.

The measurement device 1 includes a CPU (Central Processing Unit) 11, an operation receiver 12, a RAM (Random Access Memory) 13, a sensor 14, a display 15, a storage 16, and a communication interface 17. The parts of the measurement device 1 are connected to each other via a bus 18.

The CPU (an acquisition means, an identification means, a time width determination means, a counting means, a walk/run determination means, a shape determination means) 11 controls each part of the measurement device 1. The CPU 11 reads a program that is specified out of the system programs and application programs stored in the storage 16, loads it in the RAM 13, and executes various processes in cooperation with the program.

The operation receiver 12, for example, includes a touch panel, receives touch input from the user, and outputs the operation information to the CPU 11.

The touch panel is formed together with the display 15 and detects the X and Y coordinates of a contact position on the display 15 by the user using, for example, a capacitive method, a resistive method, or an ultrasonic surface acoustic wave method. The touch panel then outputs position signals regarding the X and Y coordinates of the contact position to CPU 11.

The RAM 13 is a volatile memory and forms a work area for temporarily storing various data and programs.

The sensor 14 includes a motion sensor capable of detecting the movement of the measurement device 1, such as a 3-axis accelerometer, gyro sensor, and magnetometer, and a GPS receiver capable of acquiring the position information of the measurement device 1, and outputs the measurement results to the CPU 11.

The display 15 includes an LCD (Liquid Crystal Display), an EL (Electro Luminescence) display, or the like, and performs various displays in accordance with the display information based on instructions from the CPU 11.

The storage 16 includes, for example, a flash memory, EEPROM (Electrically Erasable Programmable ROM), HDD (Hard Disk Drive), etc. The storage 16 stores system programs and application programs executed by the CPU 11, data necessary for execution of these programs, etc.

The communication interface 17 is, for example, a communication interface employing a wireless standard such as Bluetooth (registered trademark) or a wired communication interface such as a USB terminal.

<<Step Measurement Process>>

Figure 2:
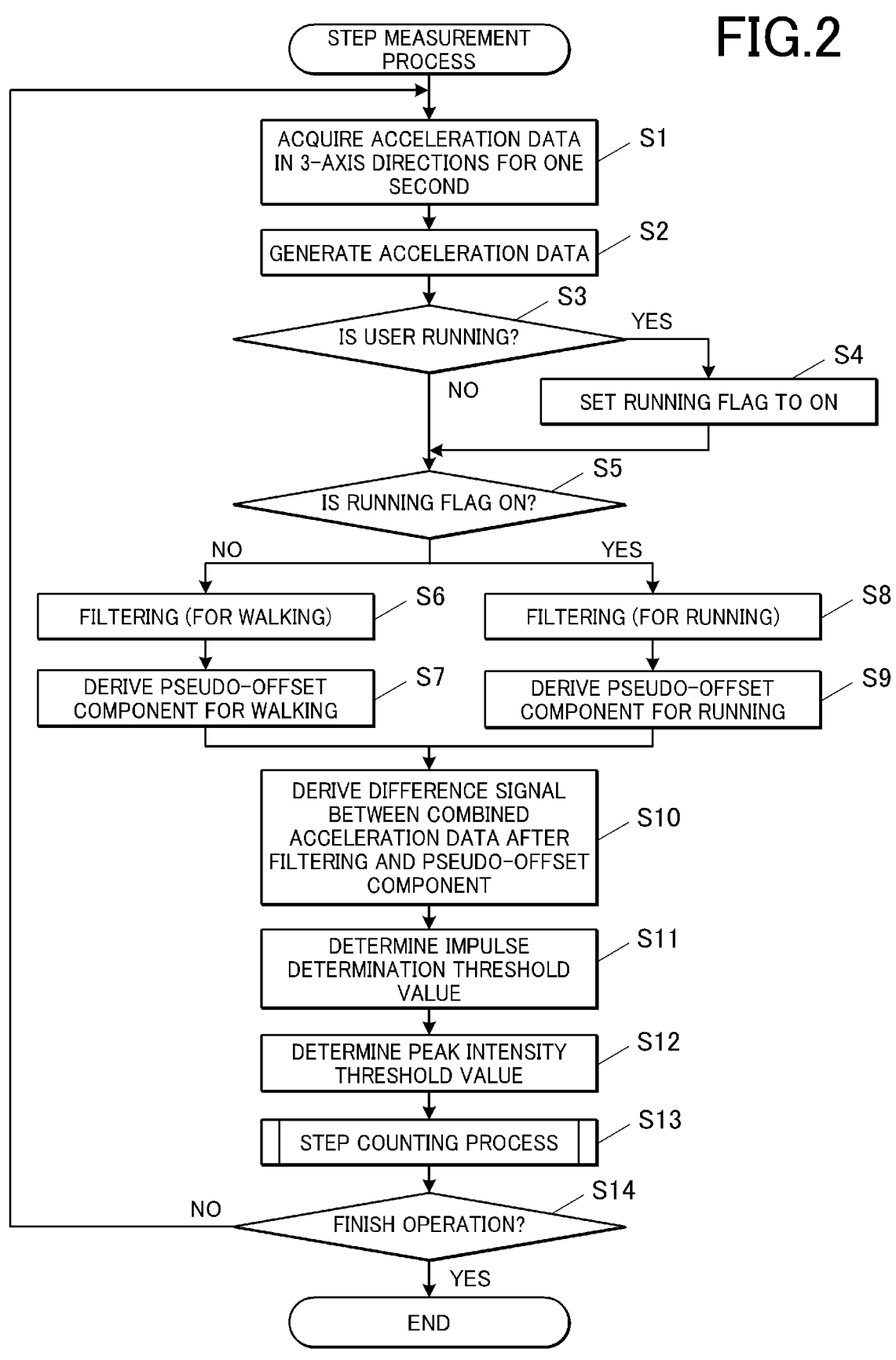
FIG. 2 is a flowchart illustrating a step measurement process.

Next, with reference to FIG. 2, the step measurement process executed by the measurement device 1 is described. FIG. 2 is a flowchart illustrating the step measurement process. The step measurement process is started, for example, upon a predetermined operation via the operation receiver 12 that instructs the measurement device 1 to start measurement of the number of steps.

When the step measurement process is started, first, the CPU 11 of the measurement device 1 acquires acceleration data in each of the 3-axis directions from the sensor 14 (step S1). Specifically, the CPU 11 acquires acceleration data in each of the 3-axis directions for one second immediately after starting measurement of the number of steps. If the CPU 11 determines in the determination process of step S14 (described later) that no predetermined operation (finish operation) has been performed to instruct the measurement device 1 to finish measuring the number of steps (step S14; NO) and returns the process to step S1, the CPU 11 acquires acceleration data in each of the 3-axis directions for one second subsequent to one second in which acceleration data in each of the 3-axis directions have been acquired in the process of the latest step S1.

Next, the CPU 11 generates combined acceleration data by combining the acceleration data of the 3-axis directions acquired in step S1 (step S2).

Next, the CPU 11 determines whether or not the user wearing the measurement device 1 is running (step S3). Specifically, if the difference between the maximum and minimum values of combined acceleration indicated by the combined acceleration data is a value that is estimated to be running (for example, 4 GHz or greater), or if the difference is a value between running and walking (for example, 1.5 to 4 GHz) and the signal of synthetic acceleration minus about 1 G (gravitational acceleration) switches from negative to positive at a frequency of about 3 Hz or more, the CPU 11 determines that the user is running based on the combined acceleration data generated in step S2.

If it is determined that the user wearing the measurement device 1 is running in step S3 (step S3; YES), the CPU 11 sets a running flag to ON (step S4). The CPU 11 then moves the process to step S5.

If it is determined in step S3 that the user wearing the measurement device 1 is not running (step S3; NO), the CPU 11 moves the process to step S5 without the process of step S4.

Next, the CPU 11 determines whether or not the running flag is set to ON (step S5).

If it is determined in step S5 that the running flag is not set to ON (step S5; NO), the CPU 11 processes the combined acceleration data generated in step S2 using a filter for walking (step S6). Specifically, the CPU 11 removes signals of 5 Hz or more from the combined acceleration data by processing the combined acceleration data using a predetermined lowpass filter. Here, signals of 5 Hz or more are removed because an upper limit of a stride rate of a human during walking is theoretically 5 Hz.

Next, the CPU 11 processes the combined acceleration data before processing using the filter for walking in step S6 using a predetermined averaging filter and derives a pseudo-offset component for walking (step S7). Then, the CPU 11 moves the process to step S10.

If it is determined in step S5 that the running flag is set to ON (step S5; YES), the CPU 11 processes the combined acceleration data generated in step S2 using a filter for running (step S8). Specifically, the CPU 11 removes signals of 5 Hz or more from the combined acceleration data by processing the combined acceleration data using a low-pass filter that is weaker than the low-pass filter for walking used in step S6.

Next, the CPU 11 processes the combined acceleration data after processing using the filter for running in step S8 using a predetermined nonlinear filter and derives a pseudo-offset component for running (step S9). Then, the CPU 11 moves the process to step S10. Here, the above nonlinear filter is a filter for deriving an average value only from data below a predetermined threshold, and the threshold is the average value of input signals for one second.

Next, if it is determined in step S5 that the running flag is not set to ON (step S5; NO), the CPU 11 derives a difference signal (variation component due to walking) (step S10) indicating the difference between the combined acceleration data after processing with the filter for walking in step S6 and the pseudo-offset component for walking derived in step S7. Here, the above difference signal is derived from the phase of the above combined acceleration data and the above pseudo-offset component aligned with each other.

If it is determined in step S5 that the running flag is set to ON (step S5; YES), the CPU 11 derives a difference signal (variation component due to running) indicating the difference between the combined acceleration data after processing with the filter for running in step S8 and the pseudo-offset component for running derived in step S9 (step S10). Here, the above difference signal is derived with the phase of the above combined acceleration data and the above pseudo-offset component aligned with each other.

Next, the CPU 11 determines an impulse determination threshold (step S11). For example, if it is determined in step S5 that the running flag is not set to ON (step S5; NO) and the maximum value of the difference signal derived in step S10 is smaller than a predetermined reference value, the CPU 11 sets the impulse determination threshold to a first fixed value (for example, 125 ms). If it is determined in step S5 that the running flag is not set to ON (step S5; NO) and the maximum value of the difference signal derived in step S10 is equal to or more than the predetermined reference value, that is, if the user is estimated to be walking quickly, the CPU 11 sets the impulse determination threshold to a second fixed value (for example, 100 ms) that is smaller than the first fixed value. If it is determined in step S5 that the running flag is set to ON (step S5; YES), the CPU 11 sets the impulse determination threshold to a third fixed value (for example, 63 ms) that is smaller than the second fixed value.

Figure 3:
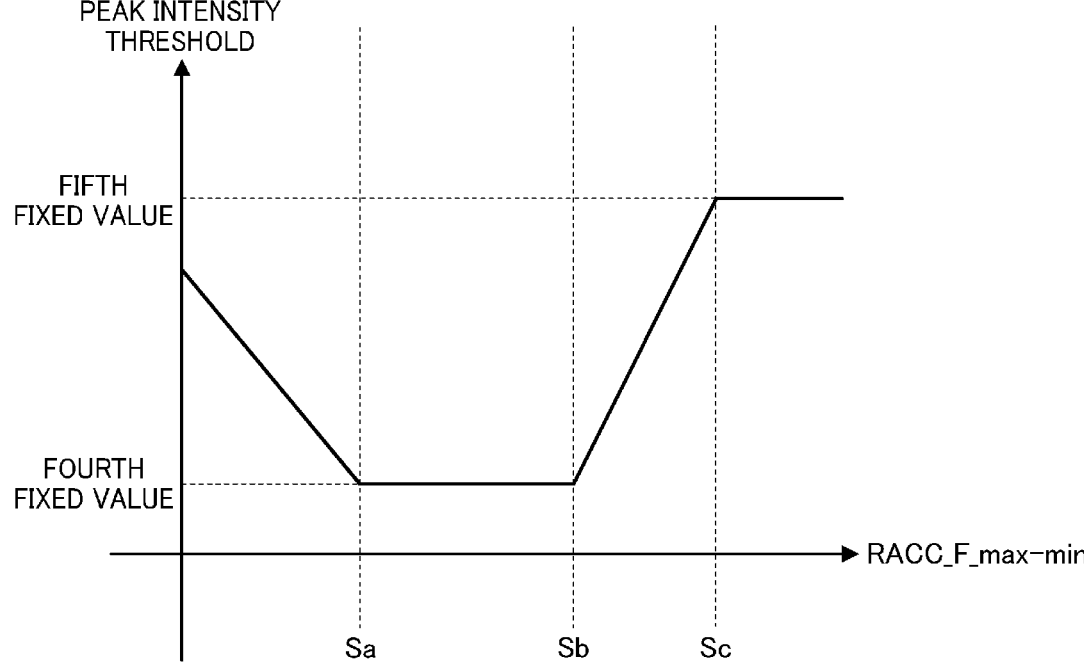
FIG. 3 is a diagram illustrating a method used to determine a peak intensity threshold.

Next, the CPU 11 determines a peak intensity threshold (step S12). For example, as illustrated in FIG. 3, when the value of RACC_F_max-min, the difference between the maximum and minimum values of the difference signal derived in step S10, is smaller than a first reference value Sa, the CPU 11 determines that there is almost no change in acceleration and that the possibility of walking is low, and sets the peak intensity threshold to a value that has a negative correlation (downward to the right) with the value of the difference RACC_F_max-min. In other words, the smaller the value of the difference RACC_F_max-min is, the larger the peak intensity threshold is, for the purpose of reducing false recognition of the number of steps. If the value of the difference RACC_F_max-min is equal to or greater than the first reference value Sa and smaller than the second reference value Sb, the CPU 11 determines that the user is walking, even if slowly, and sets the peak intensity threshold to a fourth fixed value. In other words, the peak intensity threshold is set to a low value for the purpose of reducing the number of missed steps. If the value of the difference RACC_F_max-min is equal to or greater than the second reference value Sb and smaller than the third reference value Sc, the CPU 11 determines that the user is walking and sets the peak intensity threshold to a value that has a positive correlation (upward to the right) to the value of the difference RACC_F_max-min. If the value of the difference RACC_F_max-min is equal to or greater than the third reference value Sc, the CPU 11 determines that the user is running and sets the peak intensity threshold to a fifth fixed value.

Next, the CPU 11 performs a step counting process (step S13) based on the difference signal derived in step S10, the impulse determination threshold determined in step S11, and the peak intensity threshold determined in step S12. The details of the step counting process are described later.

Next, the CPU 11 determines whether or not a predetermined operation (finish operation) instructing the measurement device 1 to finish measuring the number of steps via the operation receiver 12 has been performed (step S14).

If it is determined in step S14 that a predetermined operation instructing the measurement device 1 to finish measuring the number of steps via the operation receiver 12 has not been performed (Step S14: NO), the CPU 11 returns the process to step S1 and repeats the subsequent processes.

If it is determined in step S14 that a predetermined operation instructing the measurement device 1 to finish measuring the number of steps via the operation receiver 12 has been performed (Step S14: YES), the CPU 11 finishes the step measurement process.

<<Step Counting Process>>

Next, with reference to FIG. 4, the step counting process performed by the measurement device 1 is described. FIG. 4 is a flowchart illustrating the step counting process. In this step counting process, the measurement device 1 refers to each sampling data of the difference signal derived in step S10 along the time series, that is, in ascending order of a sample number t (1, 2, 3, . . . ), and performs the following process.

Figure 5A:
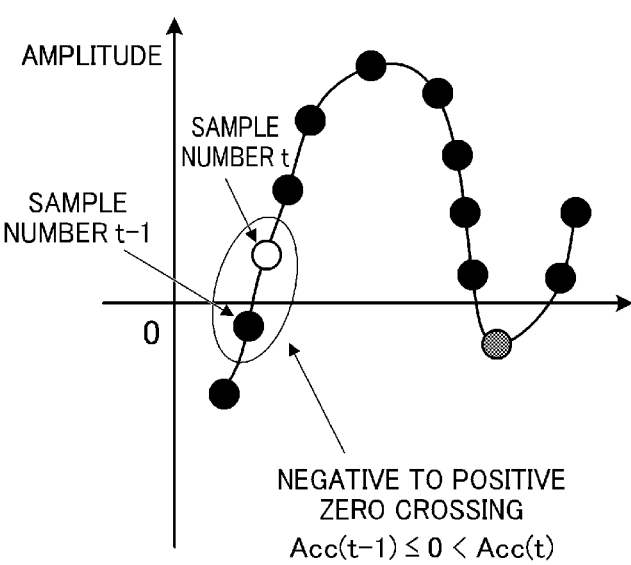
FIG. 5A is a graph illustrating a negative to positive zero crossing.

When the step counting process is started, the CPU 11 first determines whether or not a negative to positive zero crossing flag is set to ON (step S31). Here, the negative to positive zero crossing flag is a flag that is set when the signs of adjacent sampling data in time series order changes from negative to positive (crosses zero), that is, when the value of the sampling data Acc(t–1) of a smaller sample number (specifically, t–1) of the two adjacent sampling data is equal to or smaller than 0, and the value of the sampling data Acc(t) of the next sample number (specifically, t) is greater than 0 as illustrated in FIG. 5A.

If it is determined in step S31 that the negative to positive zero crossing flag is not set to ON (step S31; NO), the CPU 11 determines whether or not the sampling data Acc(t–1) of the sample number (t–1), which is smaller by one than the sample number (t) currently being referenced, is equal to or smaller than 0 and whether or not the value of sampling data Acc(t) of sample number (t) is greater than 0 (step S32).

If it is determined in step S32 that at least one of the conditions that the sampling data Acc(t–1) is equal to or smaller than 0 and that the value of sampling data Acc(t) is greater than 0 is not satisfied (step S32; NO), the CPU 11 moves the process to step S44.

If it is determined in step S32 that the conditions that the sampling data Acc(t–1) is equal to or smaller than 0 and that the value of sampling data Acc(t) is greater than 0 are both satisfied (step S32; YES), the CPU 11 sets the negative to positive zero crossing flag to ON (step S33) and moves the process to step S44.

If it is determined in step S31 that the negative to positive zero crossing flag is set to ON (step S31; YES), the CPU 11 updates the peak time length (time width) T (see FIG. 6A) to be extended (step S34). Specifically, the peak time length T up to that moment, that is, the elapsed time from the extraction timing (first timing) of the sampling data for which a negative to positive zero crossing has been made to the extraction timing of the sampling data of the sample number (t–1), which is smaller by one than the sample number (t) currently being referenced, is updated to the elapsed time from the extraction timing of the sampling data for which a negative to positive zero crossing has been made to the extraction timing of the sampling data of the sample number (t) that is currently being referenced.

Next, the CPU 11 performs a local maximum-minimum value storage process (step S35). The details of the local maximum-minimum value storage process are described later.

Next, the CPU 11 determines whether or not the value of the sampling data Acc(t) of the sample number (t) that is currently being referenced is greater than the peak intensity threshold (see FIG. 6C) (step S36).

If it is determined in step S36 that the value of the sampling data Acc(t) is greater than the peak intensity threshold (step S36; YES), the CPU 11 sets the intensity flag to ON (step S37). The CPU 11 then moves the process to step S38.

If it is determined in step S36 that the value of the sampling data Acc(t) is not greater than the peak intensity threshold (step S36; NO), the CPU 11 moves the process to step S38 without the process of step S37.

Figure 5B:
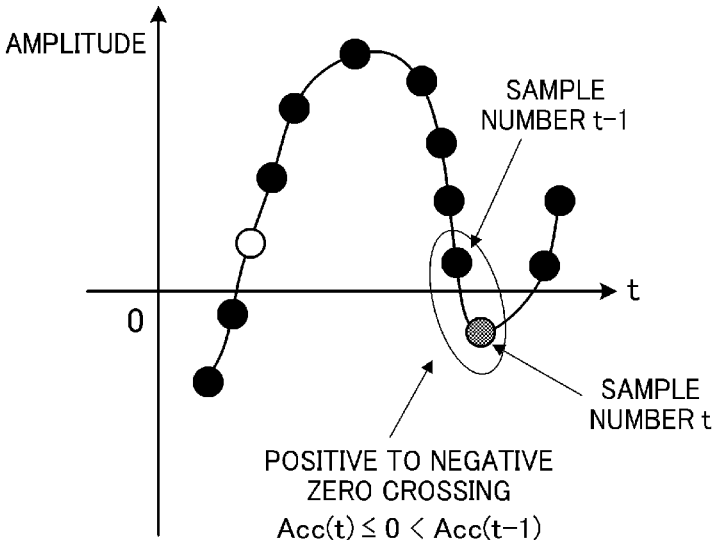
FIG. 5B is a graph illustrating a positive to negative zero crossing.

Next, the CPU 11 determines whether or not the sampling data Acc(t) of the sample number (t) currently being referenced is equal to or smaller than 0 and whether or not the value of sampling data Acc(t–1) of sample number (t–1), which is smaller by one than the sample number (t), is greater than 0 (step S38). That is, the CPU 11 determines whether or not a positive to negative zero crossing has occurred (step S38), as illustrated in FIG. 5B.

If it is determined in step S38 that at least one of the conditions that the sampling data Acc(t) is equal to or smaller than 0 and that the value of sampling data Acc(t−1) is greater than 0 is not satisfied (step S38; NO), the CPU 11 determines whether or not the peak time length T is greater than a predetermined reset threshold (see FIG. 6B) (step S39).

If it is determined in step S39 that the peak time length T is not greater than the predetermined reset threshold (step S39; NO), the CPU 11 moves the process to step S44.

If it is determined in step S39 that the peak time length T is greater than the predetermined reset threshold (step S39; YES), the CPU 11 resets various flags (negative to positive zero crossing flag, intensity flag) (step S43) and moves the process to step S44.

If it is determined in step S38 that the conditions that the sampling data Acc(t) is equal to or smaller than 0 and that the value of sampling data Acc(t−1) is greater than 0 are both satisfied (step S38; YES), the CPU 11 determines whether or not the peak time length T is greater than the impulse determination threshold (see FIG. 6B) and whether or not the intensity flag is set to ON (step S40).

If it is determined in step S40 that at least one of the conditions that the peak time length T is greater than the impulse determination threshold and that the intensity flag is set to ON is not satisfied (step S40: NO), the CPU 11 resets various flags (negative to positive zero crossing flag, intensity flag) (step S43) and moves the process to step S44.

If it is determined in step S40 that the conditions that the peak time length T is greater than the impulse determination threshold and that the intensity flag is set to ON are both satisfied (step S40; YES), the CPU 11 performs a step (n) per peak determination process (step S41). The details of the step (n) per peak determination process are described later.

Next, the CPU 11 adds the number of steps (1 or 2 steps) counted in the step (n) per peak determination process (see FIG. 8) described later to the output number of steps (step S42). Here, the CPU 11 displays the total number of steps after addition on the display 15. Then, the CPU 11 resets the various flags (negative to positive zero crossing flag, intensity flag) (step S43), and moves the process to step S44.

Next, the CPU 11 determines whether or not all sampling data (difference signals) for one second have been referenced and processed (step S44).

If it is determined in step S44 that all the sampling data (difference signals) for one second have not been referenced and processed (step S44; NO), the CPU 11 shifts the target to be referenced to the sampling data of the next sample number (step S45). The CPU 11 then returns the process to step S31 and repeats the subsequent processes.

If it is determined in step S44 that all the sampling data (difference signals) for one second have been referenced and processed (step S44; YES), the CPU 11 returns the process to the step measurement (see FIG. 2) and performs the processes after step S14.

<<Local Maximum-Minimum Value Storage Process>>

Figure 7:
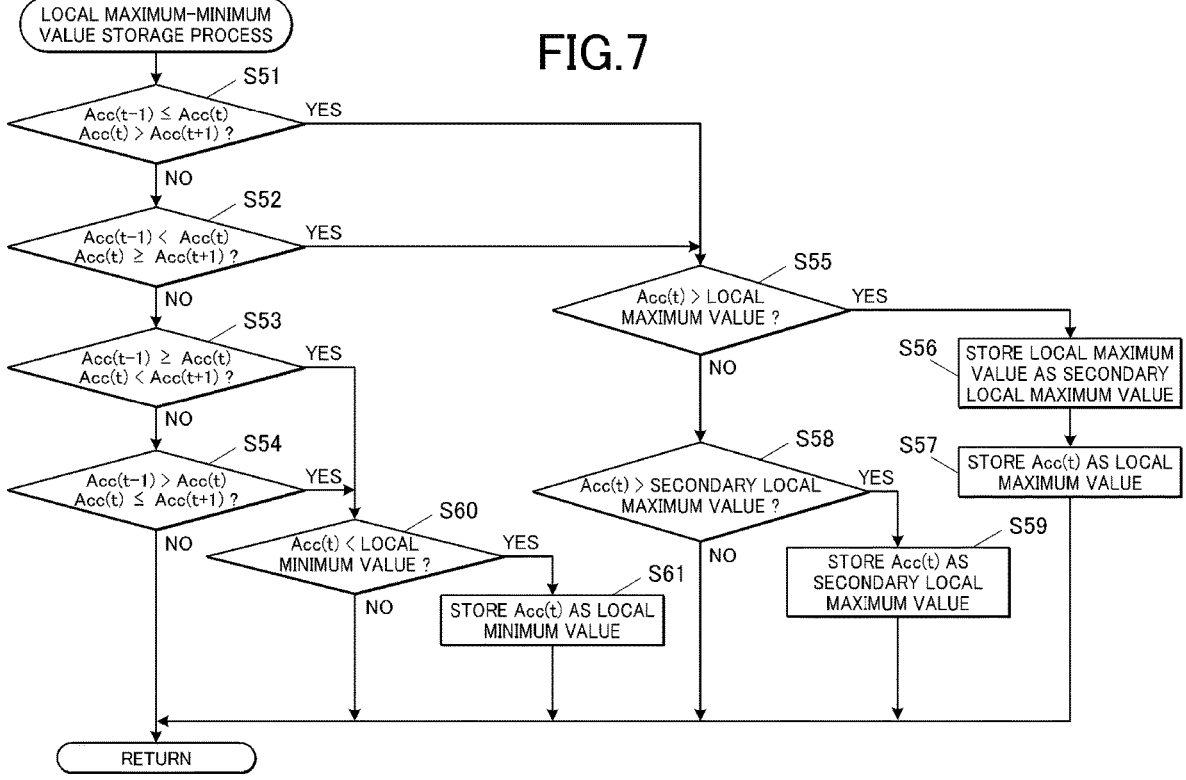
FIG. 7 is a flowchart illustrating a local maximum-minimum value storage process.

Next, with reference to FIG. 7, the local maximum-minimum value storage process executed by the measurement device 1 is described. FIG. 7 is a flowchart illustrating the local maximum-minimum value storage process.

When the local maximum-minimum value storage process is started, first, the CPU 11 determines whether or not the value of sampling data Acc(t) of sample number (t) that is currently being referenced is equal to or greater than the value of sampling data Acc(t−1) of sample number (t−1), which is smaller by one than the sample number (t), and whether or not the value of sampling data Acc(t) is greater than the value of sampling data Acc(t+1) of sample number (t+1), which is greater by one than the sample number (t) (step S51).

If it is determined in step S51 that at least one of the conditions that the value of sampling data Acc(t) is equal to or greater than the value of sampling data Acc(t−1) and that the value of sampling data Acc(t) is greater than the value of sampling data Acc(t+1) is not satisfied (step S51; NO), the CPU 11 determines whether or not the value of sampling data Acc(t) is greater than the value of sampling data Acc(t−1) and whether or not the value of sampling data Acc(t) is equal to or greater than the value of sampling data Acc(t+1) (step S52).

If it is determined in step S52 that at least one of the conditions that the value of sampling data Acc(t) is greater than the value of sampling data Acc(t−1) and that the value of sampling data Acc(t) is equal to or greater than the value of sampling data Acc(t+1) is not satisfied (step S52; NO), the CPU 11 determines whether or not the value of sampling data Acc(t) is equal to or smaller than the value of sampling data Acc(t−1) and whether or not the value of sampling data Acc(t) is smaller than the value of sampling data Acc(t+1) (step S53).

If it is determined in step S53 that at least one of the conditions that the value of sampling data Acc(t) is equal to or smaller than the value of sampling data Acc(t−1) and that the value of sampling data Acc(t) is smaller than the value of sampling data Acc(t+1) is not satisfied (step S53; NO), the CPU 11 determines whether or not the value of sampling data Acc(t) is smaller than the value of sampling data Acc(t−1) and whether or not the value of sampling data Acc(t) is equal to or smaller than the value of sampling data Acc(t+1) (step S54).

If it is determined in step S54 that at least one of the conditions that the value of sampling data Acc(t) is smaller than the value of sampling data Acc(t−1) and that the value of sampling data Acc(t) is equal to or smaller than the value of sampling data Acc(t+1) is not satisfied (step S54; NO), the CPU 11 returns the process to the step counting process (see FIG. 4) and performs the processes after step S36.

If it is determined in step S51 that the conditions that the value of sampling data Acc(t) is equal to or greater than the value of sampling data Acc(t−1) and that the value of sampling data Acc(t) is greater than the value of sampling data Acc(t+1) are both satisfied (step S51; YES), or if it is determined in step S52 that the conditions that the value of sampling data Acc(t) is greater than the value of sampling data Acc(t−1) and that the value of sampling data Acc(t) is equal to or greater than the value of sampling data Acc(t+1) (step S52; YES), the CPU 11 determines whether or not the value of sampling data Acc(t) is greater than a local maximum value that is temporarily stored in the RAM 13 (step S55). If no local maximum value is stored in the RAM 13, the CPU 11 performs the determination process of step S55 using a predetermined default value as a local maximum value.

If it is determined in step S55 that the value of sampling data Acc(t) is greater than the local maximum value that is temporarily stored in the RAM 13 (step S55; YES), the CPU 11 temporarily stores the local maximum value in the RAM 13 as a secondary local maximum value (step S56).

Next, the CPU 11 temporarily stores the value of sampling data Acc(t) of sample number (t) that is currently being referenced in the RAM 13 as the local maximum value (step S57). The CPU 11 then returns the process to the step counting process (see FIG. 4) and performs the processes after step S36.

If it is determined in step S55 that the value of sampling data Acc(t) is not greater than the local maximum value that is temporarily stored in the RAM 13 (step S55; NO), the CPU 11 determines whether or not the value of sampling data Acc(t) is greater than the secondary local maximum value that is temporarily stored in the RAM 13 (step S58). The secondary local maximum value means that it is smaller than the above local maximum value. If no secondary local maximum value is stored in the RAM 13, the CPU 11 performs the determination process of step S58 using a predetermined default value as a secondary local maximum value.

If it is determined in step S58 that the value of sampling data Acc(t) is greater than the secondary local maximum value that is temporarily stored in the RAM 13 (step S58; YES), the CPU 11 temporarily stores the value of sampling data Acc(t) in the RAM 13 as the secondary local maximum value (step S59). The CPU 11 then returns the process to the step counting process (see FIG. 4) and performs the processes after step S36.

If it is determined in step S58 that the value of sampling data Acc(t) is not greater than the secondary local maximum value that is temporarily stored in the RAM 13 (step S58; NO), the CPU 11 returns the process to the step counting process (see FIG. 4) and performs the processes after step S36.

If it is determined in step S53 that the conditions that the value of sampling data Acc(t) is equal to or smaller than the value of sampling data Acc(t−1) and that the value of sampling data Acc(t) is smaller than the value of sampling data Acc(t+1) are both satisfied (step S53; YES), or if it is determined in step S54 that the conditions that the value of sampling data Acc(t) is smaller than the value of sampling data Acc(t−1) and that the value of sampling data Acc(t) is equal to or smaller than the value of sampling data Acc(t+1) are both satisfied (step S54; YES), the CPU 11 determines whether or not the value of sampling data Acc(t) is smaller than a local minimum value that is temporarily stored in the RAM 13 (step S69). If no local minimum value is stored in the RAM 13, the CPU 11 performs the determination process of step S60 using a predetermined default value as a local minimum value.

If it is determined in step S60 that the value of sampling data Acc(t) is smaller than the local minimum value that is temporarily stored in the RAM 13 (step S60; YES), the CPU 11 temporarily stores the value of sampling data Acc(t) in the RAM 13 as a local minimum value (step S61). The CPU 11 then returns the process to the step counting process (see FIG. 4) and performs the processes after step S36.

If it is determined in step S60 that the value of sampling data Acc(t) is not smaller than the local minimum value that is temporarily stored in the RAM 13 (step S60; NO), the CPU 11 returns the process to the step counting process (see FIG. 4) and performs the processes after step S36.

<<Step (n) Per Peak Determination Process>>

Figure 8:
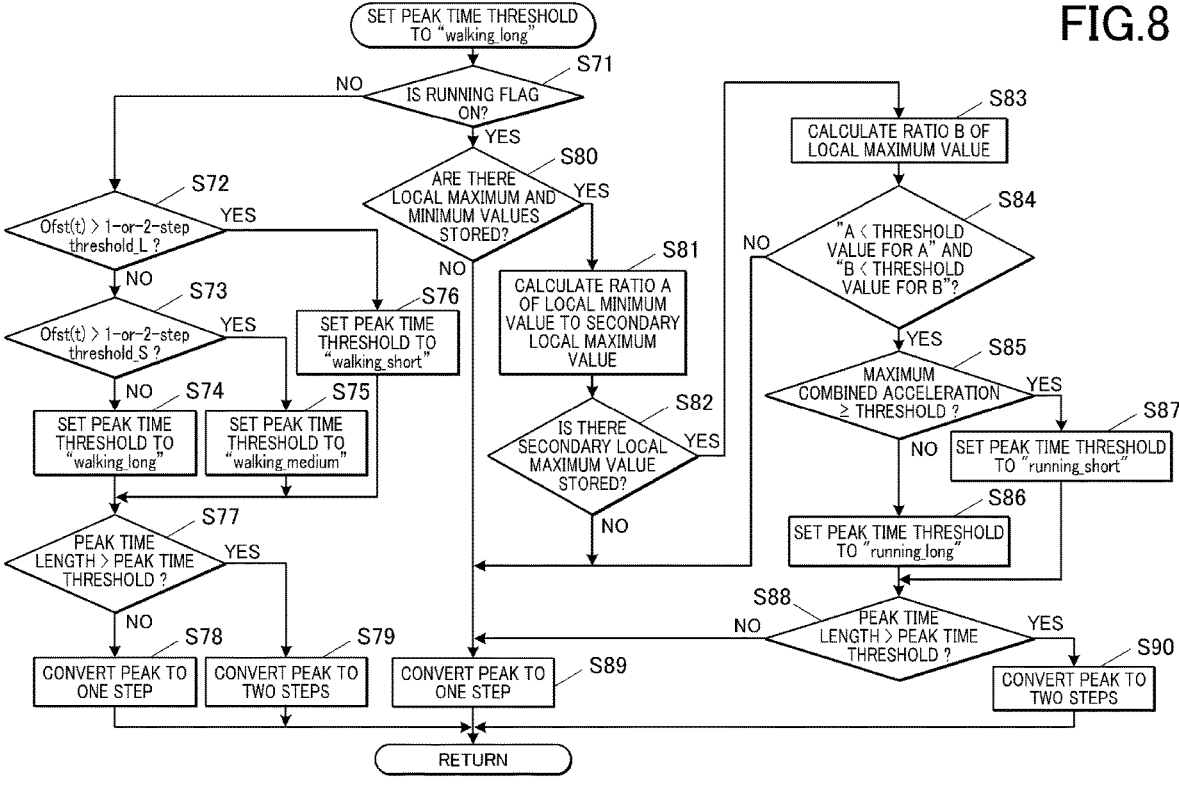
FIG. 8 is a flowchart illustrating a step (n) per peak determination process.

Next, with reference to FIG. 8, the step (n) per peak determination process performed by the measurement device 1 is described. FIG. 4 is a flowchart illustrating the step (n) per peak determination process.

When the step (n) per peak determination process is started, the CPU 11 first determines whether or not the running flag is set to ON (step S71).

If it is determined in step S71 that the running flag is not set to ON (step S71; NO), the CPU 11 determines whether or not a value of a pseudo-offset component Ofst(t) of the sample number (t) currently being referenced is greater than a predetermined 1-or-2-step threshold_L (step S72).

If it is determined in step S72 that the value of the pseudo-offset component Ofst(t) is greater than the predetermined 1-or-2-step threshold_L (step S72; YES), the CPU 11 sets a peak time threshold (see FIG. 9) to a threshold of "walking_short" (step S76). The CPU 11 then moves the process to step S77.

If it is determined in step S72 that the value of the pseudo-offset component Ofst(t) is not greater than the predetermined 1-or-2-step threshold_L (step S72; NO), the CPU 11 determines whether or not the value of the pseudo-offset component Ofst(t) is greater than a predetermined 1-or-2-step threshold_S (step S73). The 1-or-2-step threshold_S is smaller than the 1-or-2-step threshold_L described above.

If it is determined in step S73 that the value of the pseudo-offset component Ofst(t) is greater than a predetermined 1-or-2-step threshold_S (step S73; YES), the CPU 11 sets the peak time threshold (see FIG. 9) to a threshold of "walking_medium" (step S75). The CPU 11 then moves the process to step S77.

If it is determined in step S73 that the value of the pseudo-offset component Ofst(t) is not greater than a predetermined 1-or-2-step threshold_S (step S73; NO), the CPU 11 sets the peak time threshold (see FIG. 9) to a threshold of "walking_long" (step S74). The CPU 11 then moves the process to step S77.

Next, the CPU 11 determines whether or not the peak time length T (see FIG. 6A) is greater than the peak time threshold (see FIG. 9) (step S77).

Figure 9:
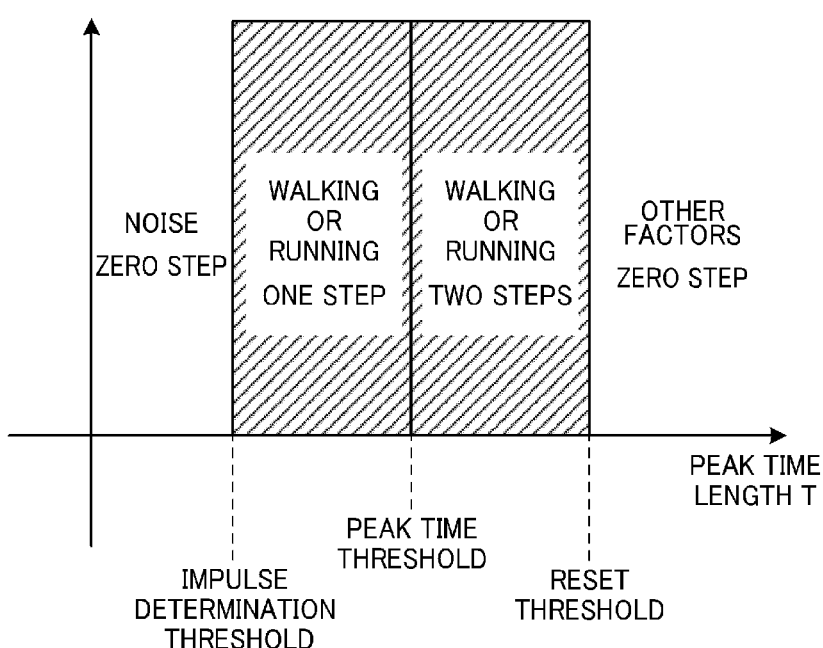
FIG. 9 is a graph illustrating a peak time threshold.

If it is determined in step S77 that the peak time length T is greater than the peak time threshold (step S77; YES), the CPU 11 counts the peak of the peak time length T as two steps as illustrated in FIG. 9 and adds two to the number of steps (step S79). Then, the CPU 11 returns the process to the step counting process (see FIG. 4) and performs the processes after step S42.

If it is determined in step S77 that the peak time length T is not greater than the peak time threshold (step S77; NO), the CPU 11 counts the peak of the peak time length T as one step as illustrated in FIG. 9 and adds one to the number of steps (step S78). Then, the CPU 11 returns the process to the step counting process (see FIG. 4) and performs the processes after step S42.

If it is determined in step S71 that the running flag is set to ON (step S71; YES), the CPU 11 determines whether or not the local maximum value and the local minimum value are stored in the RAM 13 (step S80).

If it is determined in step S80 that at least one of the local maximum value and the local minimum value is not stored in the RAM 13 (step S80; NO), the CPU 11 counts the peak of the peak time length T as one step and adds one to the number of steps (step S89). Then, the CPU 11 returns the process to the step counting process (see FIG. 4) and performs the processes after step S42.

If it is determined in step S80 that both the local maximum value and the local minimum value are stored in the RAM 13 (step S80; YES), the CPU 11 calculates a ratio A of the local minimum value to the local maximum value ((Local Min.)/(Local Max.)) (step S81).

Next, the CPU 11 determines whether or not the secondary local maximum value is stored in the RAM 13 (step S82).

If it is determined in step S82 that the secondary local maximum value is not stored in the RAM 13 (step S82; NO), the CPU 11 counts the peak of the peak time length T as one step and adds one to the number of steps (step S89). Then, the CPU 11 returns the process to the step counting process (see FIG. 4) and performs the processes after step S42.

If it is determined in step S82 that the secondary local maximum value is stored in the RAM 13 (step S82; YES), the CPU 11 calculates a ratio B of the secondary local maximum value to the local maximum value ((2nd Local Max.)/(Local Max.)) (step S83).

Figure 10A:
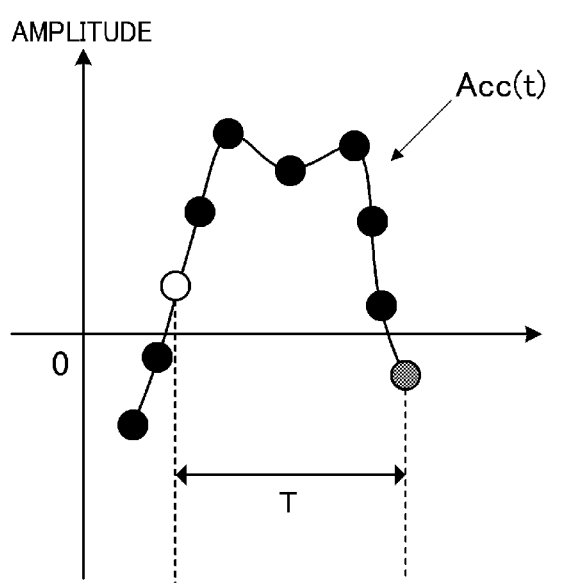
FIG. 10A is a graph illustrating an example of an acceleration waveform having two local maximum values and one local minimum value.
Figure 10B:
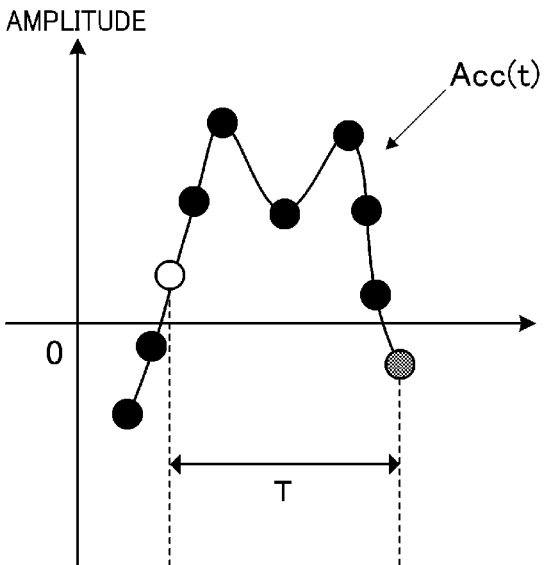
FIG. 10B is a graph illustrating an example of an acceleration waveform having two local maximum values and one local minimum value.
Figure 10C:
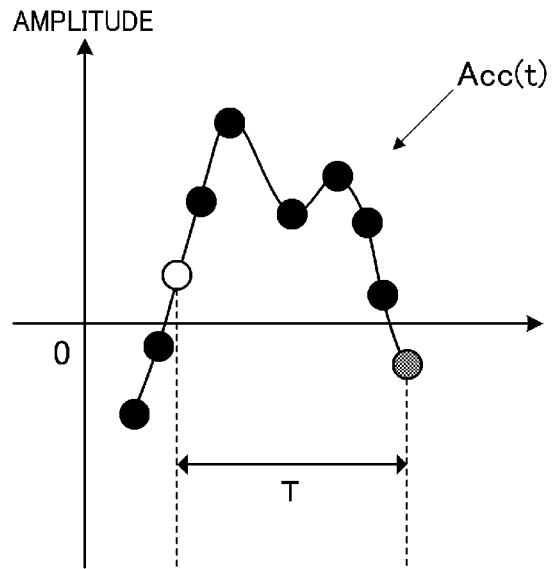
FIG. 10C is a graph illustrating an example of an acceleration waveform having two local maximum values and one local minimum value.
Figure 10D:
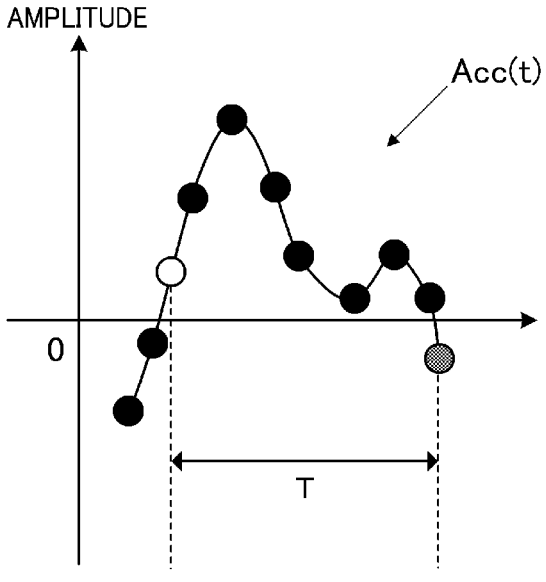
FIG. 10D is a graph illustrating an example of an acceleration waveform having two local maximum values and one local minimum value.

Next, the CPU 11 determines whether or not the ratio A calculated in step S81 is smaller than a predetermined threshold for ratio A and whether or not the ratio B calculated in step S83 is smaller than a predetermined threshold for ratio B (step S84). In other words, the CPU 11 performs the determination process in step S84 to distinguish an acceleration waveform with two peaks mixed together (acceleration waveform of two steps) illustrated in FIG. 10A to FIG. 10C, from an acceleration waveform without two peaks mixed together (acceleration waveform of one step), as illustrated in FIG. 10D. FIG. 10A illustrates an acceleration waveform in which the difference between two local maximum values is small and the difference between the larger of the two local maximum values and the local minimum value is small. FIG. 10B illustrates an acceleration waveform in which the difference between two local maximum values is small and the difference between the larger of the two local maximum values and the local minimum value is medium. FIG. 10C illustrates an acceleration waveform in which the difference between two local maximum values is medium and the difference between the larger of the two local maximum values and the local minimum value is medium. FIG. 10D illustrates an acceleration waveform in which the difference between two local maximum values is large and the difference between the larger of the two local maximum values and the local minimum value is large.

If it is determined in step S84 that at least one of the conditions that the ratio A is smaller than the predetermined threshold for ratio A and that the ratio B is smaller than the predetermined threshold for ratio B is not satisfied (step S84; NO), the CPU 11 counts the peak of the peak time length T as one step and adds one to the number of steps (step S89). Then, the CPU 11 returns the process to the step counting process (see FIG. 4) and performs the processes after step S42.

If it is determined in step S84 that the conditions that the ratio A is smaller than the predetermined threshold for ratio A and that the ratio B is smaller than the predetermined threshold for ratio B are both satisfied (step S84; YES), the CPU 11 determines whether or not the maximum value of sampling data up to the sample number (t) that is currently being referenced is equal to or greater than a predetermined threshold (step S85).

If it is determined in step S85 that the maximum value of sampling data up to the sample number (t) is equal to or greater than the predetermined threshold (step S85; YES), the CPU 11 sets a peak time threshold (see FIG. 9) to a threshold of "running_short" (step S87). The CPU 11 then moves the process to step S88.

If it is determined in step S85 that the maximum value of sampling data up to the sample number (t) is not equal to or greater than the predetermined threshold (step S85; NO), the CPU 11 sets a peak time threshold (see FIG. 9) to a threshold of "running_long" (step S86). The CPU 11 then moves the process to step S88.

Next, the CPU 11 determines whether or not the peak time length T (see FIG. 10A to FIG. 10C) is greater than the peak time threshold (see FIG. 9) (step S88).

If it is determined in step S88 that the peak time length T is greater than the peak time threshold (step S88; YES), the CPU 11 counts the peak of the peak time length T as two steps as illustrated in FIG. 9 and adds two to the number of steps (step S90). Then, the CPU 11 returns the process to the step counting process (see FIG. 4) and performs the processes after step S42.

If it is determined in step S88 that the peak time length T is not greater than the peak time threshold (step S88; NO), the CPU 11 counts the peak of the peak time length T as one step as illustrated in FIG. 9 and adds one to the number of steps (step S89). Then, the CPU 11 returns the process to the step counting process (see FIG. 4) and performs the processes after step S42.

<<Evaluation of Step Measurement Performance>>

Figure 11:
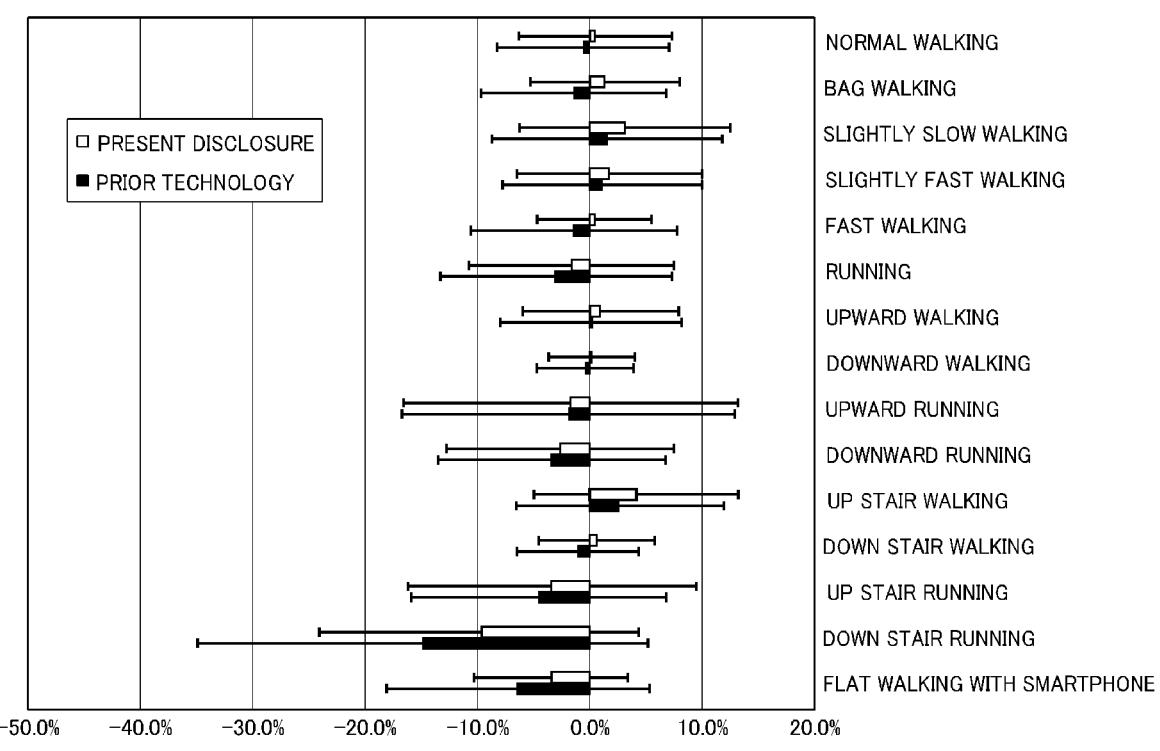
FIG. 11 is a graph illustrating error rates of step measurement when 57 subjects walked or ran in each of 15 kinds of movements.

Next, evaluation of step measurement performance is explained using FIG. 11.

FIG. 11 is a graph illustrating error rates of step measurement when 57 subjects walked or ran in each of the 15 kinds of movements. The error rate shown in the upper row of each pattern is the error rate in the step measurement using the measurement device 1 of the present embodiment. On the other hand, the error rate shown in the lower row of each pattern is the error rate in the step measurement using the measurement device disclosed in JP2020-101849A, according to the technology before the present disclosure was made.

"Normal walking" means walking without holding anything. "Bag walking" means walking with a bag. "Slightly slow walking" means walking at a slightly slower pace than the "normal walking". "Slightly fast walking" means walking at a slightly faster pace than the "normal walking" and at a slower pace than "fast walking". "Fast walking" means walking at a faster pace than the "slightly fast walking" and at a slower pace than "running". "Upward walking" means walking upwards. "Downward walking" means walking downwards. "Upward running" means running upwards. "Downward running" means running downwards. "Up stair walking" means walking up the stairs. "Down stair walking" means walking down the stairs. "Up stair running" means running up the stairs. "Down stair running" means running down the stairs. "Flat walking with smartphone" means walking on a flat ground while looking at a smartphone.

The average error rate for all movements shown in FIG. 11 was 0.6±8.6% according to the measurement device 1 of the present embodiment, and 2.2±10.0% according to the measurement device of the prior technology. That is, the error rate was reduced by more than 1% due to the technology of the present embodiment. In particular, the error rates in up/down stair running, which is likely to cause miscounting, was greatly improved. Furthermore, according to the present disclosure, the number of measured steps tends to increase, which is suitable for the purpose of the present disclosure of avoiding omissions in counting.

As described above, according to the present embodiment, the measurement device 1 acquires data of an acceleration waveform during walking or running of a user from the accelerometer, identifies a peak time length (time width) T between a first timing and a second timing based on the data of the acceleration waveform, the acceleration waveform changing from a negative value to a positive value at the first timing, the acceleration waveform changing from a positive value to a negative value at the second timing. Upon a predetermined condition being satisfied in counting the steps, the measurement device 1 counts the acceleration waveform whose peak time length T is greater than a predetermined threshold as two steps during the walking or the running and count the acceleration waveform whose peak time length T is smaller than the predetermined threshold as one step during the walking or the running.

Therefore, according to the measurement device 1, it is possible to reduce the number of signals that are actually combined signals corresponding to two steps being erroneously counted as one step by, under a predetermined condition, counting a peak of peak time length T that is greater than the peak time threshold (a predetermined threshold) as two steps during walking or running, and by counting a peak of peak time length T that is equal to or smaller than the peak time threshold as one step during walking or running Because a step is recognized based on the height of the peak of the acceleration according to the technology disclosed in JP 2009-116389 A, a combined signal that is actually equivalent to two steps may be erroneously recognized as one step. In contrast, according to the measurement device 1, the number of steps can be correctly measured.

The measurement device 1 identifies the peak time length T based on the data of the acceleration waveform from which an offset component has been removed, the offset component being acquired by processing the data of the acceleration waveform with a predetermined filter. Specifically, the measurement device 1 determines whether the user is walking or running based on the data of the acceleration waveform, and, upon the at least one processor determining that the user is running, identifies the peak time length T based on the data of the acceleration waveform from which an offset component has been removed, the offset component being acquired by processing the data of the acceleration waveform with a predetermined nonlinear filter. Alternatively, the measurement device 1 determines whether the user is walking or running based on the data of the acceleration waveform, and, upon the at least one processor determining that the user is walking, identifies the peak time length T based on the data of the acceleration waveform from which the offset component has been removed, the offset component being acquired by processing the data of the acceleration waveform with a predetermined averaging filter.

Therefore, according to the measurement device 1, the peak time length T can be accurately identified. As a result, the number of steps during walking or running can be accurately measured.

The predetermined condition includes a condition that the at least one processor determines that the user is running and a condition that the acceleration waveform from which the offset component has been removed is in a predetermined shape, and the measurement device 1 counts the acceleration waveform whose peak time length T is greater than a predetermined threshold for running as two steps during the running and counts the acceleration waveform whose peak time length T is smaller than the predetermined threshold for running as one step during the running.

Therefore, according to the measurement device 1, omissions in counting during running can be suitably avoided.

The measurement device 1 determines whether or not the acceleration waveform is in the predetermined shape based on a ratio of two local maximum values out of local maximum values in the acceleration waveform, one local maximum value out of the local maximum values, and one local minimum value out of local minimum values in the acceleration waveform. Therefore, the determination can be suitably performed.

The measurement device 1 changes the peak time threshold for running ("running_long" or "running_short") depending on acceleration according to the acceleration waveform from which an offset component has been removed. Therefore, omissions in counting during running can be more suitably avoided.

The predetermined condition includes a condition that the at least one processor determines that the user is walking, and the measurement device 1 counts the acceleration waveform whose peak time length T is greater than a peak time threshold for walking ("walking_long", "walking_medium", or "walking_short") as two steps during the walking and counts the acceleration waveform whose time width is smaller than the predetermined threshold for walking as one step during the walking.

Therefore, according to the measurement device 1, omissions in counting during walking can be suitably avoided.

The measurement device 1 changes the peak time threshold for walking ("walking_long", "walking_medium", or "walking_short") depending on a value of the offset component. Therefore, omissions in counting during walking can be more suitably avoided.

The measurement device 1 determines whether or not the peak time length (time width) T is within a predetermined range and counts the steps based on the acceleration waveform whose peak time length T is determined to be within the predetermined range.

Therefore, the steps can be counted appropriately according to the measurement device 1 because the steps are counted only from the acceleration waveforms whose peak time length T is determined to be within a predetermined range (that is, the acceleration waveforms derived from walking or running by the user), while impulse signals having a narrow peak time length T and signals having a wide peak time length T derived from other movements are excluded.

Although the embodiments of the present disclosure have been described above, it goes without saying that the present disclosure is not limited to such embodiments and can be varied in various ways to the extent not departing from the gist thereof.

For example, in the above embodiment, the impulse determination threshold is determined according to the maximum value of the difference signal derived in step S10 of the step measurement process (see FIG. 2). However, the impulse determination threshold may be determined using the frequency characteristics of the synthetic acceleration or the results of behavior estimation based on the sensing data acquired by the sensor 14.

In the above embodiment, the reset threshold used in the determination of step S39 in the step counting process (see FIG. 4) may be variable. In such a case, the CPU 11 of the measurement device 1, for example, determines whether or not the user is walking at a slower speed than usual based on the amplitude of the difference signal and the peak time length T derived in step S10 of the step measurement process (see FIG. 2), and sets the reset threshold differently when the user is determined to be walking at a slower speed than usual and when the user is determined not to be walking at a slower speed. More specifically, the CPU 11 of the measurement device 1 sets the reset threshold when the user is determined to be walking at a slower speed than usual to be larger than the reset threshold when the user is determined not to be walking at a slower speed than usual.

In the above embodiment, if it is determined that the running flag is not set to ON in the step (n) per peak determination process (step S71; NO, see FIG. 8), the CPU 11 sets the peak time threshold to "walking_short", "walking_medium", or "walking_long" depending on the pseudo-offset component Ofst(t) of the sample number (t) currently being referenced. If it is determined that the running flag is set to ON in the step (n) per peak determination process (step S71; YES), the CPU 11 sets the peak time threshold to "running_long" or "running_short" depending on the pseudo-offset component Ofst(t) of the sample number (t) currently being referenced. However, the peak time threshold may be gradually changed.

Although only one peak time threshold is set in the above embodiment (see FIG. 9), two peak time thresholds may be set, for example, a peak time threshold_L and a peak time threshold_S. In such a case, if the peak time length T is greater than the peak time threshold_L, the peak of the peak time length T is counted as three steps. If the peak time length T is equal to or smaller than the peak time threshold_L and greater than the peak time threshold_S, the peak of the peak time length T is counted to two steps. If the peak time length T is equal to or smaller than the peak time threshold_S, the peak of the peak time length T is counted as one step.

In the above embodiment, if it is determined in step S40 of the step counting process (see FIG. 4) that the conditions that the peak time length T is greater than the impulse determination threshold and that the intensity flag is set to ON are both satisfied (step S40; YES), the CPU 11 performs the step (n) per peak determination process (step S41). However, the condition for moving to step S41 may not include the fact that the intensity flag is set to ON. In other words, if it is determined in step S40 that the peak time length T is greater than the impulse determination threshold, the CPU 11 may perform the step (n) per peak determination process (step S41).

In the step (n) per peak determination process (see FIG. 8) in the above embodiment, the shape of the acceleration waveform is determined using the ratio A of the local minimum value to the local maximum value and the ratio B of the secondary local maximum value to the local maximum value. However, for example, an image recognition AI (Artificial Intelligence) engine may be used to determine the shape of the acceleration waveform.

In the above embodiment, the measurement device 1 includes the sensor 14, but does not need to include a sensor 14. When the measurement device 1 does not include the sensor 14, a sensor configured separately from the measurement device 1 may detect and store the acceleration while the user is walking or running, and after the end of the walking or running, the measurement device 1 may acquire the stored acceleration from the sensor and determine whether or not the acceleration waveform is derived from the walking or running of the user.

In the above description, the ROM 61 is exemplified as a computer-readable storage medium for the program(s) of the present disclosure, but it is not limited to this. Various types of nonvolatile memories such as such as a flash memory and EEPROM (Electrically Erasable and Programmable Read Only Memory), a CD-ROM, DVD disks, and the like can be used as the computer-readable storage medium. Further, as a medium to provide data of the program(s) of the present disclosure via a communication line, a carrier wave may be used in the present disclosure.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-006795, filed Jan. 19, 2023 which is hereby incorporated by reference wherein in its entirety.

The invention claimed is:
1. A measurement device comprising:
an accelerometer;
a storage; and
at least one processor that, in accordance with instructions stored in the storage,
    acquires data of an acceleration waveform during walking or running of a user from the accelerometer,
    identifies a time width between a first timing and a second timing based on the data of the acceleration waveform, the acceleration waveform changing from a negative value to a positive value at the first timing, the acceleration waveform changing from a positive value to a negative value at the second timing, and
    counts steps based on the acceleration waveform,
wherein, upon a predetermined condition being satisfied in counting the steps, the at least one processor counts the acceleration waveform whose time width is greater than a predetermined threshold as two steps during the walking or the running and count the acceleration waveform whose time width is smaller than the predetermined threshold as one step during the walking or the running.

2. The measurement device according to claim 1, wherein the at least one processor identifies the time width based on the data of the acceleration waveform from which an offset component has been removed, the offset component being acquired by processing the data of the acceleration waveform with a predetermined filter.

3. The measurement device according to claim 2, wherein the at least one processor further determines whether the user is walking or running based on the data of the acceleration waveform, and wherein, upon the at least one processor determining that the user is running, the at least one processor identifies the time width based on the data of the acceleration waveform from which an offset component has been removed, the offset component being acquired by processing the data of the acceleration waveform with a predetermined nonlinear filter.

4. The measurement device according to claim 3, wherein the predetermined condition includes a condition that the at least one processor determines that the user is running and a condition that the acceleration waveform from which the offset component has been removed is in a predetermined shape, and wherein the at least one processor counts the acceleration waveform whose time width is greater than a predetermined threshold for running as two steps during the running and counts the acceleration waveform whose time width is smaller than the predetermined threshold for running as one step during the running.

5. The measurement device according to claim 4, wherein the at least one processor further determines whether or not the acceleration waveform is in the predetermined shape based on a ratio of two local maximum values out of local maximum values in the acceleration waveform, one local maximum value out of the local maximum values, and one local minimum value out of local minimum values in the acceleration waveform.

6. The measurement device according to claim 4, wherein the at least one processor changes the predetermined threshold for running depending on acceleration according to the acceleration waveform.

7. The measurement device according to claim 2, wherein the at least one processor further determines whether the user is walking or running based on the data of the acceleration waveform, and wherein, upon the at least one processor determining that the user is walking, the at least one processor identifies the time width based on the data of the acceleration waveform from which the offset component has been removed, the offset component being acquired by processing the data of the acceleration waveform with a predetermined averaging filter.

8. The measurement device according to claim 7, wherein the predetermined condition includes a condition that the at least one processor determines that the user is walking, and wherein the at least one processor counts the acceleration waveform whose time width is greater than a predetermined threshold for walking as two steps during the walking and counts the acceleration waveform whose time width is smaller than the predetermined threshold for walking as one step during the walking.

9. The measurement device according to claim 8, wherein the at least one processor changes the predetermined threshold for walking depending on a value of the offset component.

10. The measurement device according to claim 1, wherein the at least one processor determines whether or not the time width is within a predetermined range, and wherein the at least one processor counts the steps based on the acceleration waveform whose time width is determined to be within the predetermined range.

11. A measurement method performed by a measurement device having an accelerometer, the measurement method comprising:

acquiring data of an acceleration waveform during walking or running of a user from the accelerometer;

identifying a time width between a first timing and a second timing based on the data of the acceleration waveform, the acceleration waveform changing from a negative value to a positive value at the first timing, the acceleration waveform changing from a positive value to a negative value at the second timing; and counting steps based on the acceleration waveform, wherein, upon a predetermined condition being satisfied, the counting includes counting the acceleration waveform whose time width is greater than a predetermined threshold as two steps during the walking or the running and count the acceleration waveform whose time width is smaller than the predetermined threshold as one step during the walking or the running.

12. The measurement method according to claim 11, wherein the identifying includes identifying the time width based on the data of the acceleration waveform from which an offset component has been removed, the offset component being acquired by processing the data of the acceleration waveform with a predetermined filter.

13. The measurement method according to claim 12, further comprising:

determining whether the user is walking or running based on the data of the acceleration waveform, and wherein, upon the user being determined to be running in the determining, the identifying includes identifying the time width based on the data of the acceleration waveform from which an offset component has been removed, the offset component being acquired by processing the data of the acceleration waveform with a predetermined nonlinear filter.

14. The measurement method according to claim 12, further comprising:

determining whether the user is walking or running based on the data of the acceleration waveform, wherein, upon the user being determined to be walking in the determining, the identifying includes identifying the time width based on the data of the acceleration waveform from which the offset component has been removed, the offset component being acquired by processing the data of the acceleration waveform with a predetermined averaging filter.

15. The measurement method according to claim 11, further comprising:

determining whether or not the time width is within a predetermined range, wherein the counting includes counting the steps based on the acceleration waveform whose time width is determined to be within the predetermined range.

16. A non-transitory computer readable storage medium storing a program executable by at least one processor in a measurement device having an accelerometer, the program causing the at least one processor to perform:

acquiring data of an acceleration waveform during walking or running of a user from the accelerometer;

identifying a time width between a first timing and a second timing based on the data of the acceleration waveform, the acceleration waveform changing from a negative value to a positive value at the first timing, the acceleration waveform changing from a positive value to a negative value at the second timing; and counting steps based on the acceleration waveform, wherein, upon a predetermined condition being satisfied, the counting includes counting the acceleration waveform whose time width is greater than a predetermined threshold as two steps during the walking or the running and count the acceleration waveform whose time width is smaller than the predetermined threshold as one step during the walking or the running.

17. The non-transitory computer readable storage medium according to claim 16, wherein the identifying includes identifying the time width based on the data of the acceleration waveform from which an offset component has been removed, the offset component being acquired by processing the data of the acceleration waveform with a predetermined filter.

18. The non-transitory computer readable storage medium according to claim 17, the program causing the at least one processor to perform:

determining whether the user is walking or running based on the data of the acceleration waveform, and wherein, upon the user being determined to be running in the determining, the identifying includes identifying the time width based on the data of the acceleration waveform from which an offset component has been removed, the offset component being acquired by processing the data of the acceleration waveform with a predetermined nonlinear filter.

19. The non-transitory computer readable storage medium according to claim 17, the program causing the at least one processor to perform:

determining whether the user is walking or running based on the data of the acceleration waveform, wherein, upon the user being determined to be walking in the determining, the identifying includes identifying the time width based on the data of the acceleration waveform from which an offset component has been removed, the offset component being acquired by processing the data of the acceleration waveform with a predetermined averaging filter.

20. The non-transitory computer readable storage medium according to claim 16, the program causing the at least one processor to perform:

determining whether or not the time width is within a predetermined range, wherein the counting includes counting the steps based on the acceleration waveform whose time width is determined to be within the predetermined range.

* * * * *